March 12, 1946. L. L. SCHAFFER ET AL 2,396,438
LUMBER CORE PANEL
Filed May 24, 1943
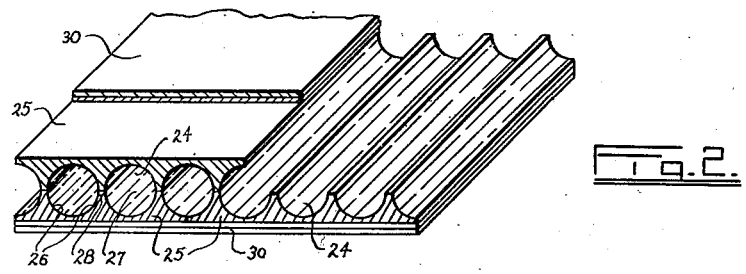
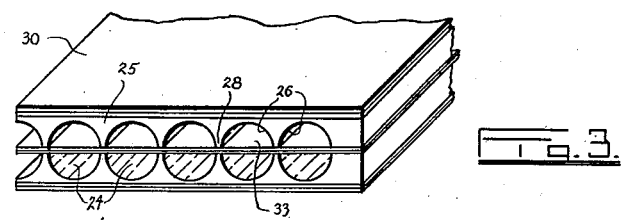
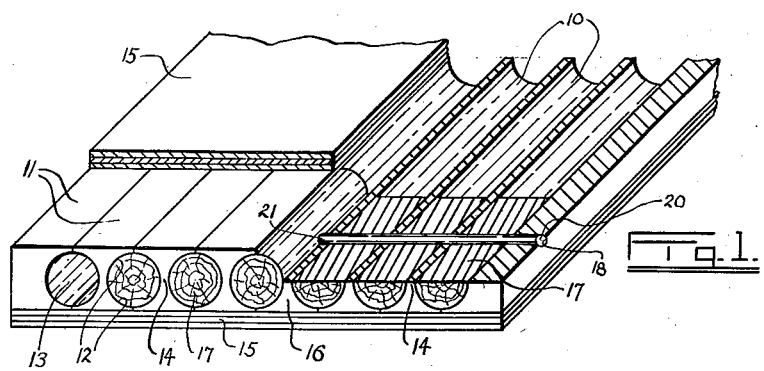
INVENTORS
LESLIE LASZLO SCHAFFER
JOHN HUBERMAN
BY
Fetherstonhaugh & Co
ATTORNEYS.

Patented Mar. 12, 1946

2,396,438

UNITED STATES PATENT OFFICE 2,396,438

LUMBER CORE PANEL

Leslie Laszlo Schaffer and John Huberman, Vancouver, British Columbia, Canada

Application May 24, 1943, Serial No. 488,254

1 Claim. (Cl. 20—91)

This invention relates to a method of lightening wood or the like for any desired purpose.

An object of the present invention is the provision of a method of lightening wood or the like and the assembly of this lightened material into lumber core panels of hitherto unattained strength/weight ratio.

Another object is the provision of a method of efficiently lightening wood while retaining most of its strength properties.

Another object is the provision of a method of producing extremely light and stiff lumber core panels of relatively great strength.

A further object is the provision of a very light and easily handled heat and sound insulators, stiffeners and fillers.

A still further object is the provision of a method of lightening wood for cores in panels or the like in which the weight and strength properties of the finished article may be predetermined within reasonable limits, when being designed.

Yet another object is provision of a method of assembling units for a lumber core without the use of glue between said units.

With the above and other objects in view, the present invention consists essentially of the method of lightening material, such as wood or the like, without proportionally reducing its strength, which consists in forming at least one channel in a surface of a piece of material with at least one arch formed in the channel, said arch extending from a point adjacent the surface of the piece to approximately the deepest part of the channel, as more fully described and illustrated by way of example in the following specification and the accompanying drawing, in which Figure 1 is a sectional perspective view of one form of the invention, Figure 2 is a similar view of an alternative form of the invention, Figure 3 is a section through a variation of Figure 2.

In Figure 1 the method of lightening material, such as wood or the like, consists in forming at least one open channel 10 in one or more surfaces of each piece 11 of the wood, said channels usually extending the width of the piece. It is preferable to form a channel in each of two opposed surfaces of a piece, but the pieces at the edges of a unit may not have channels in their outer surfaces, as shown. Each channel 10 is formed with arches 12 at its opposite ends and these arches extend throughout the width of the channels. Each arch extends from a point adjacent the surface of the piece to approximately the deepest part of the channel. In this example, the arches 12 at the opposite ends of a channel actually meet so that they form a continuous curve from one end to the other of the channel. It will be understood, however, that the arches may be separated so that they do not form such a curve.

The pieces 11 are assembled as shown in Figure 1 and are glued or otherwise fastened together at their adjacent surfaces with the channels of each piece registering with the corresponding ones of the next adjacent pieces to form enclosed channels 13 extending the width of the pieces. In this illustration, the channels 13 are circular in section. If more than one layer of these pieces were required, each piece may have a channel 10 in either or both surfaces facing the additional layer or layers.

Each piece 11 actually has a web 14 between its opposite channels and in the finished article these resist any pressure from the opposite surfaces of the article. The arches 12 direct the pressure to the webs.

The unit thus formed may be used by itself for any desired purpose, or it may be used as a core in a panel, in which case either or both of its surfaces are covered with one or more wooden laminations 15. If more than one lamination is used on a surface, the grain of the different laminations may be arranged as desired. On the other hand, with only one lamination, its grain should run across the pieces 11. The channels 13 open outwardly at the opposite edges 16 of the panel, and these edges may be capped, or as shown, wooden dowels or plugs 17 may be inserted into the ends of said channels. These dowels not only close the channel ends, but they strengthen the panel ends. If it is desired to strengthen or stiffen the panel at any desired point or points, dowels may be inserted in the channels at the required point or points. For example, dowels may be inserted in the channels at points where it is desired to drive nails, screws or the like into the panel to enable them to obtain a proper grip.

As stated above, the strips or pieces 11 may be glued or otherwise fastened together. It has, however, been found that if the pieces are not glued together, there is less likelihood of the panel warping or twisting. To this end, one or more holes 18 may be drilled through each piece across the channels 10 and webs 14. When the pieces are placed side by side, stringer dowels 20, as shown, or pieces of twine or the like, may be inserted in the alined holes 18 to hold said pieces in place until the laminations 15 are glued on them. If dowels are used, these may have holes 21 drilled therein through which the stringer dowels or twine may extend. The stringer must be glued in place at least at their ends. It is preferable also to at least spot glue the dowels 17 in place in order to prevent shifting.

In Figure 2, the method consists in forming a plurality of corresponding channels 24 in the adjacent surfaces of two pieces 25 of wood. These channels have arches 26 at their opposite ends, and they preferably extend throughout the full width of the pieces. Here again, the arches may form a continuous curve from end to end of the channels, as shown.

In assembly, the adjacent surfaces of the pieces 25 are glued together with the corresponding channels 24 is registry. The united channels now form closed channels 27 extending the full width of the pieces. With this arrangement, webs 28 are formed between the channels for absorbing pressure on the exposed surfaces of the pieces and the arches 26 distribute this pressure as described above.

This unit may be used by itself, or it may have one or more laminations 30 secured to either or both of its surfaces to form a cored panel. If it is necessary to plug up the ends or any portion of any of the closed channels 27, it is only necessary to insert a dowel in the channel or channels where required, as in Figure 1.

The alternative of Figure 3 is similar to that of Figure 2, but one or more thin laminations 33 of wood have been inserted between said pieces. If a single lamination is used, its grain runs across the channels 27, while the grain of a plurality of laminations may be arranged as desired. Although the lamination or laminations add to the weight of the finished article, it greatly increases its strength. The compression strength of this panel with the laminations 30 and 33, is the same as or greater than the strength of a solid panel formed of the same material, and yet the weight has been greatly reduced. The reason for this is that the centre lamination tends to spread any stress at any point on the panel to a relatively large number of webs 28.

Cutting out sections of wood generally reduces the strength properties to a much greater extent than would be proportionate to the loss in weight. This invention achieves the reduction in weight of the wood while suffering at the utmost a proportionate loss of some of the strength properties, while in some cases, retaining higher than proportionate and sometimes even the full values of the strength properties of the wood.

The cores or panels thus produced may be used for many different purposes, such as for flooring, ceiling and wall units; flush doors; table tops; furniture; built-in cupboards, etc.; heat and sound insulators; stiffeners; and fillers. The insulators, stiffeners and fillers are very light and easy to handle, and they will not shift around in the spaces into which they are inserted.

The alternative of Figure 1 lends itself best to mass production. The stiffeners and strength of this panel may be influenced:

(a) In a longitudinal direction by:
  (1) Increasing the thickness of webs 14,
  (2) Placing one or more wider strips or pieces 10 in a panel, said strips or pieces having wider webs therein,
  (3) Making the channels 17 smaller or larger in relation to the strips, and/or placing them closer to one surface than the other of the panel,
  (4) Varying the thickness, composition, number or grain direction of the laminations 15.

(b) In a lateral direction by:
  (1) Filling one or more channels with dowels,
  (2) Inserting dowels in the channels at desired points,
  (3) The use of stringer dowels 20,
  (4) Capping the open ends of the channels,
  (5) Varying the thickness, composition, number of grain direction of the laminations 15.

Cores and panels constructed according to this invention are particularly adaptable for aircraft where lightness consistent with strength is required. For example, these panels may be used for flooring, partitions, bulkheads, bunks, shelves, tables, etc. If a panel of a certain weight and having a specified strength is called for, it is possible to design such a panel by regulating the factors above set out.

Although this method is primarily designed for solid wood, it will readily be understood that it may be used in connection with boards or the like formed of ply wood, laminated wood, fibrous compounds, plastics, textile laminations, and the like.

The strips or units 11 of Figure 1 may be magnified and used individually as light and strong structural timber, such as beams, posts and the like, of hitherto unattained strength/weight ratio. These units may be formed from single pieces of wood, or they may be laminated. In either case, the strength and weight properties of the finished product may be predetermined within closer limits than with ordinary laminated or plain structural timber made for the same purpose.

The core covering laminations and centre laminations are not confined to wood, but they may be linoleum, asbestos, paper, fibrous or textile sheets, metal or plastic sheets, or any combination of these. The method of assembling lumber core units without glue as described above, is not limited to the lightened wood units but may be applied with advantage to the types of lumber core units now in use, said method preventing warping, twisting and waviness of the panel.

Various modifications may be made in this invention without departing from the spirit thereof or the scope of the claim and, therefore, the exact forms shown are to be taken as illustrative only and not in a limiting sense, and it is desired that only such limitations shall be placed thereon as are disclosed in the prior art or are set forth in the accompanying claim.

What we claim as our invention is:

A lumber core panel comprising a plurality of strips of material having a groove on opposing side edges, said strips being placed in side by side relation to form a panel core having parallel longitudinal passages extending therethrough, the ends of said passages being closed with plugs, said plugs being held against endwise movement in the passages by dowels extending through the several strips and the plugs and a lamination of veneer secured to at least one face of the panel core.

LESLIE LASZLO SCHAFFER.
JOHN HUBERMAN.